US009969179B2

(12) United States Patent
Bowers et al.

(10) Patent No.: US 9,969,179 B2
(45) Date of Patent: May 15, 2018

(54) ASSEMBLIES, SYSTEMS, AND METHODS FOR FRANKING ONE OR MORE SEQUENTIAL MAILPIECE ON A HIGH SPEED MAIL SORTER

(71) Applicant: Bell and Howell, LLC, Durham, NC (US)

(72) Inventors: Brian Bowers, Mundelein, IL (US); Richard A. Yankloski, Webster, NY (US)

(73) Assignee: Fluence Automation LLC, Wheeling, IL (US)

( * ) Notice: Subject to any disclaimer, the term of this patent is extended or adjusted under 35 U.S.C. 154(b) by 0 days. days.

(21) Appl. No.: 15/454,086

(22) Filed: Mar. 9, 2017

(65) Prior Publication Data

US 2017/0259585 A1 Sep. 14, 2017

Related U.S. Application Data

(60) Provisional application No. 62/305,637, filed on Mar. 9, 2016.

(51) Int. Cl.
*B41J 3/28* (2006.01)
*G06K 1/12* (2006.01)
(Continued)

(52) U.S. Cl.
CPC ............... *B41J 3/28* (2013.01); *G06K 1/121* (2013.01); *G06K 19/06037* (2013.01);
(Continued)

(58) Field of Classification Search
CPC ..... B41J 3/28; G06K 1/121; G06K 19/06037; G07B 17/0008; G07B 17/00508;
(Continued)

(56) References Cited

U.S. PATENT DOCUMENTS 5,917,925 A * 6/1999 Moore ...................... G09F 3/00
382/101
7,805,384 B1 9/2010 Pagel
(Continued)

FOREIGN PATENT DOCUMENTS

EP 2808845 12/2014
EP 3093825 A1 11/2016
EP 3217363 A1 9/2017

OTHER PUBLICATIONS

Notice of Publication for European Application No. 15202933 dated Oct. 19, 2016.
(Continued)

*Primary Examiner* — Anh T. N. Vo
(74) *Attorney, Agent, or Firm* — Jenkins, Wilson, Taylor & Hunt, P.A.

(57) ABSTRACT

Assemblies, systems, and methods for applying postage indicia to one or more sequential mailpiece on a high speed mail sorter are disclosed. In some aspects, a system for franking one or more sequential mailpiece using a postal security device (PSD) hub assembly on a high speed mail sorter includes a plurality of PSDs configured to generate a coded digital signature for the one or more sequential mailpiece during a latency period, a plurality of photo sensors configured to define the latency period, a PSD host configured to receive the generated coded digital signature, wherein the generated coded digital signature is encoded in a data matrix, and an indicia printer configured to receive printer control data and to print the printer control data on the one or more sequential mailpiece in an order in which the plurality of PSDs are tasked during the latency period.

39 Claims, 6 Drawing Sheets

(51) Int. Cl.
*G06K 19/06* (2006.01)
*G07B 17/00* (2006.01)

(52) U.S. Cl.
CPC ... *G07B 17/0008* (2013.01); *G07B 17/00467* (2013.01); *G07B 17/00508* (2013.01); *G06K 2019/06253* (2013.01); *G07B 2017/0058* (2013.01); *G07B 2017/00475* (2013.01); *G07B 2017/00701* (2013.01)

(58) Field of Classification Search
CPC ........ G07B 17/00467; G07B 17/00475; G07B 17/0058; G07B 17/00701; G07B 17/00967; G07B 19/06253
See application file for complete search history.

(56) References Cited

U.S. PATENT DOCUMENTS

| | | | |
|---|---|---|---|
| 7,882,036 B1 * | 2/2011 | Yankloski | G07B 17/00508 705/401 |
| 9,208,620 B1 * | 12/2015 | Bortnak | G07B 17/0008 |
| 2002/0083020 A1 | 6/2002 | Leon | |
| 2004/0036893 A1 | 2/2004 | Sussmeier | |
| 2004/0057073 A1 | 3/2004 | Egawa | |
| 2004/0204788 A1 | 10/2004 | Liberty | |
| 2005/0065896 A1 | 3/2005 | Kummer | |
| 2005/0069365 A1 | 3/2005 | Miller | |
| 2005/0069367 A1 | 3/2005 | Sussmeier | |
| 2006/0294030 A1 | 12/2006 | Mattern et al. | |
| 2008/0162381 A1 | 7/2008 | Runstrom et al. | |
| 2009/0071730 A1 | 3/2009 | Hahn | |
| 2010/0063622 A1 | 3/2010 | Fappiano | |
| 2010/0292833 A1 | 11/2010 | Gorp | |
| 2016/0332467 A1 | 11/2016 | Bowers | |

OTHER PUBLICATIONS

Extended European Search Report for Application No. 15202933 dated Sep. 21, 2016.
Non-Final Office Action for U.S. Appl. No. 14/757,837 dated Jan. 12, 2017.
Extended European Search Report for European Application No. 17160174.3 dated Jul. 11, 2017.
Notice of Allowance for U.S. Appl. No. 14/757,837, dated Jul. 28, 2017.
Notice of Publication for European Application No. 17160174.3 dated Aug. 17, 2017.

* cited by examiner

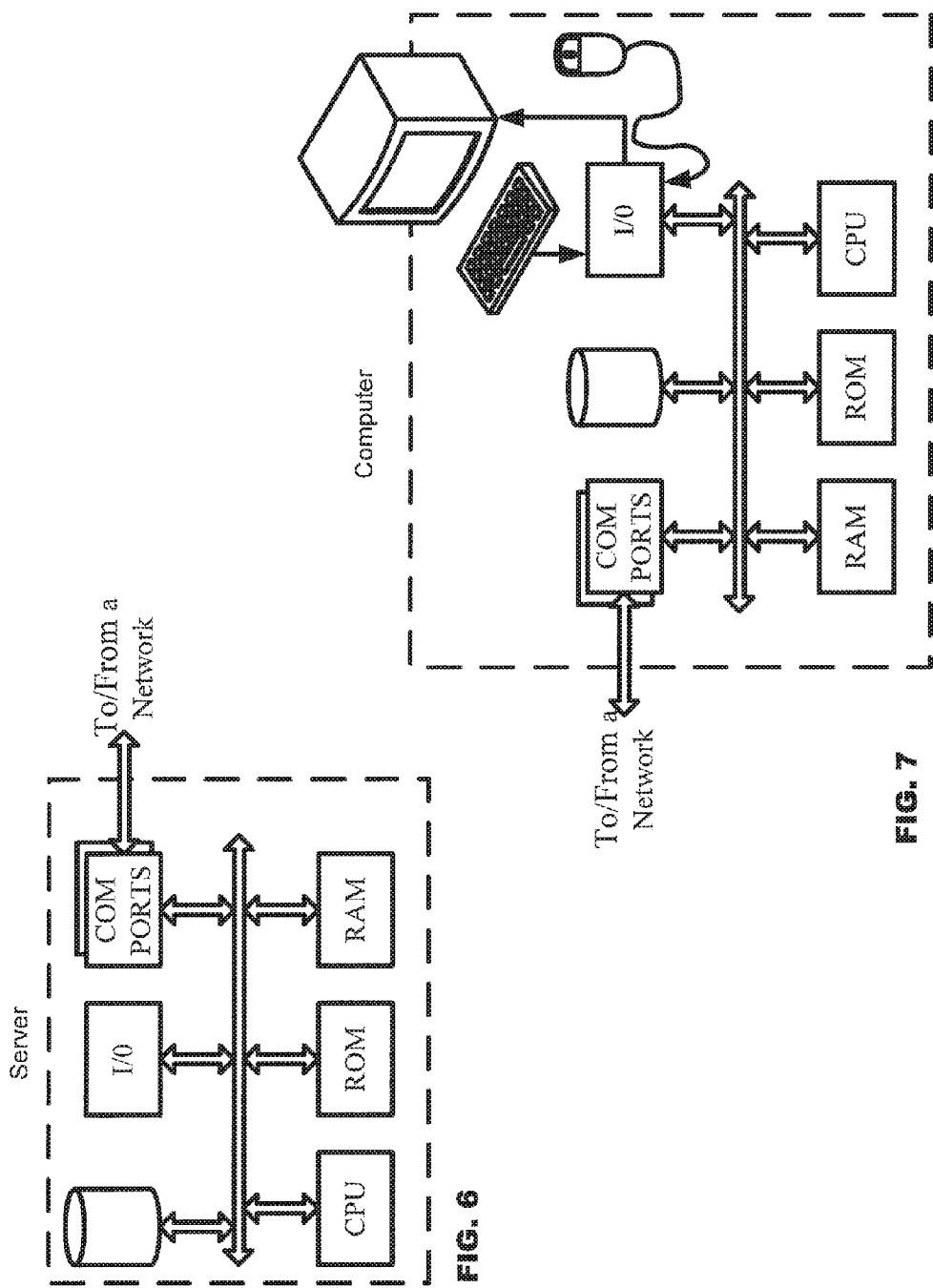

ASSEMBLIES, SYSTEMS, AND METHODS FOR FRANKING ONE OR MORE SEQUENTIAL MAILPIECE ON A HIGH SPEED MAIL SORTER

TECHNICAL FIELD

The present subject matter relates to techniques and equipment for printing postage indicia. More particularly, the present subject matter relates to assemblies, systems, and methods for applying postage indicia to one or more sequential mailpiece on a high speed mail sorter.

BACKGROUND

Franking systems or postage meters are generally used as stand-alone devices or are attached to moderate speed mail inserters in order to print postage indicia on an envelope. Limiting factors for high speed franking include the time needed to obtain a postage allocation from the postal security device (PSD) and to generate the printer commands. Postage meters are not used on high speed mail sorters that have transport belt speeds of 120 to 165 inches per second (ips) or greater due to the postage meter processing speed restrictions. A single PSD cannot generate postage meter indicia at a rate of approximately 12 or more letters per second as is required for a high speed sorter.

Hence a need exists for assemblies, systems, and methods for applying postage indicia to one or more mailpiece on a high speed mail sorter, such that postage meter indicia may be printed on envelopes at high processing rates, such as rates exceeding 13 mailpieces per second.

SUMMARY

Assemblies, systems, and methods for applying postage indicia (e.g., postage meter indicia) to one or more mailpiece on a high speed mail sorter are disclosed herein.

In one aspect, a PSD hub assembly can have a plurality of PSDs configured to generate a coded digital signature for the one or more sequential mailpiece during a latency period; a PSD host configured to receive the generated coded digital signature, wherein the generated coded digital signature is encoded in a data matrix; and an indicia printer configured to receive printer control data and to print the printer control data on the one or more sequential mailpiece in an order in which the plurality of PSDs are tasked during the latency period.

In another aspect, a system for franking mailpieces using a PSD hub assembly on a high speed mail sorter can have a plurality of PSDs configured to generate a coded digital signature for the one or more sequential mailpiece during a latency period; a plurality of photo sensors configured to define the latency period, where the latency period is a period of time sufficient for transfer of the generated coded digital signature from one of the plurality of PSDs; a PSD host configured to receive the generated coded digital signature and where the generated coded digital signature is encoded in a data matrix; and an indicia printer configured to receive printer control data and to print the printer control data on the one or more sequential mailpiece in an order in which the plurality of PSDs are tasked during the latency period.

In a further aspect, a method for franking mailpieces using a PSD hub assembly on a high speed mail sorter is disclosed. The method is performed by generating, by a plurality of PSDs, a coded digital signature for the one or more sequential mailpiece during a latency period; defining, by a plurality of photo sensors, the latency period, wherein the latency period is a period of time sufficient for transfer of the generated coded digital signature from one of the plurality of PSDs; receiving, by a PSD host, the generated coded digital signature, wherein the generated coded digital signature is encoded in a data matrix; and printing, by the indicia printer, received printer control data on the one or more sequential mailpiece in an order in which the plurality of PSDs are tasked during the latency period.

Exemplary advantages and novel features are set forth in part in the description which follows, and in part will become apparent to those skilled in the art upon examination of the following and the accompanying drawings or may be learned by production or operation of the examples. Advantages of the present teachings may be realized and attained by practice or use of the methodologies, instrumentalities and combinations described herein.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 6 is an example illustration of a network or host computer platform, as can typically be used to implement a server, in accordance with the disclosure herein.

FIG. 7 is an example illustration of a computer with user interface elements, as can be used to implement a personal computer or other type of work station or terminal device, in accordance with the disclosure herein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings. Reference now is made in detail to the examples illustrated in the accompanying drawings and discussed below.

A sorter configuration that provides the latency needed for postal security device (PSD) access and for postage meter indicia printing is described herein. The required latency period is achieved by requesting the postage indicia in advance of the mailpiece reaching the printer over a transport path. Multiple PSD devices are network connected to provide sufficient time to encode the PSD response during the latency period available from the time the postage request is made and the encoded indicia data is available for transmission to the printer.

Figure 1:
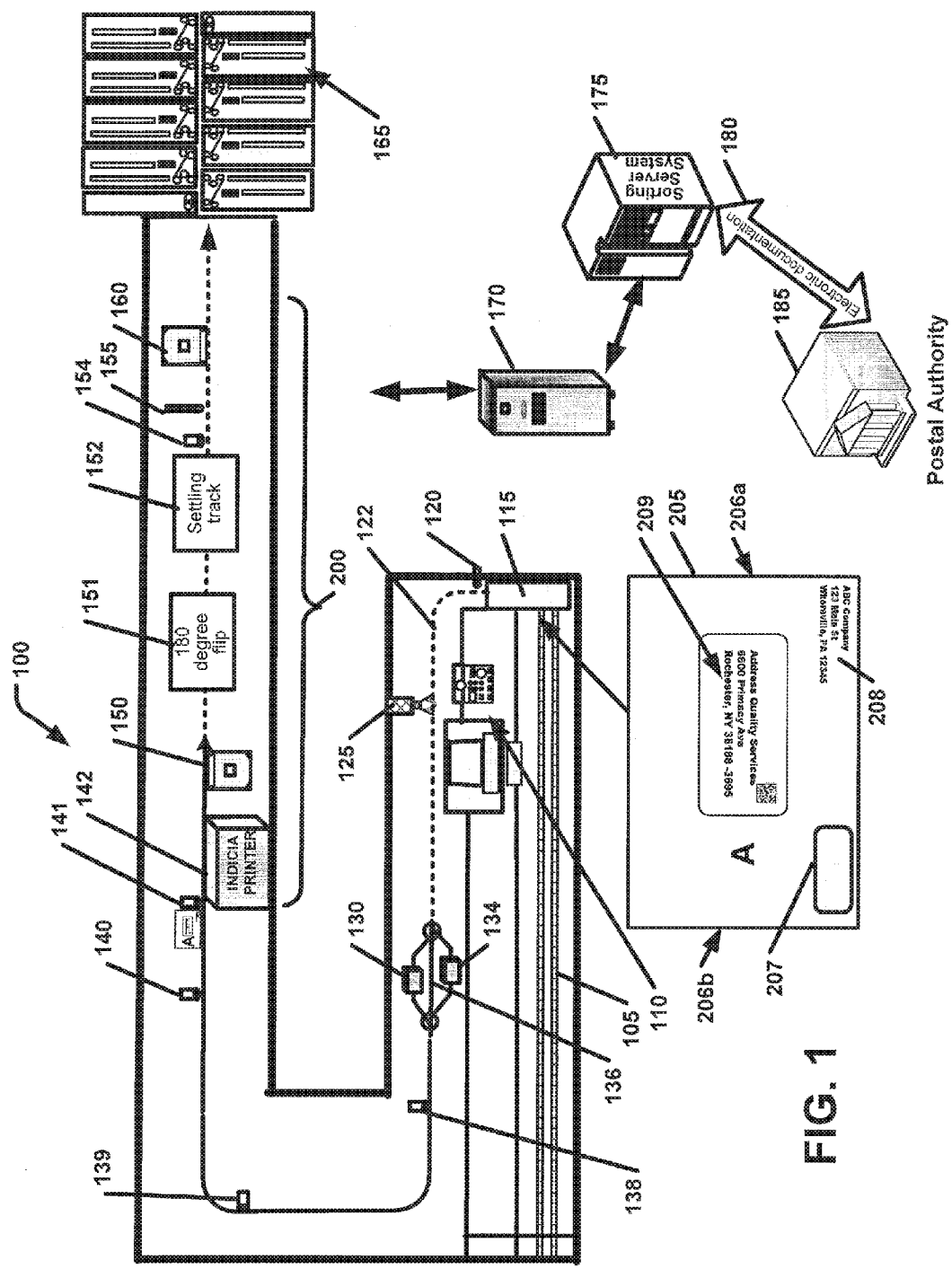
FIG. 1 is an example schematic illustration of a high speed mail sorter system, including an assembly for applying postage indicia to one or more sequential mailpiece on a high speed mail sorter, in accordance with the disclosure herein.

FIG. 1 illustrates a high speed mail sorter or sorter system, generally designated 100, that is configured for postage metering of mailpieces with variably sized envelopes 205. In some aspects, a PSD hub assembly can frank mailpieces in high speed mail sorters running greater than 30,000 mailpieces per hour. The sorter has a control panel, display, and keyboard, generally designated 110, that are used to set up sorting jobs and control sorting operations. The control panel, display and keyboard 110 interface to the sorter control electronics and to sorter computer 170. Sorter computer 170 receives job parameters and sends job results to the sorting server 175. Sorting server 175 generates and transmits mailing documentation 180 to the Postal Authority 185 when processing is completed. Sorting server 175 receives and stores sort job setup data, meter parameters, image processing directories plus other data as needed for operations via a network connection to other devices and to postal authority 185. Envelopes 205 are placed on magazine 105 so that the addressed side is facing feeder 115. The envelopes 205 are oriented upside down so that indicia print area 207 (e.g., a an area for postage meter indicium to be printed) of each of envelopes 205 is located at a constant distance from the top of envelope 205 as referenced to the magazine surface. Also, additional items can be printed by indicia printer 142, such as, for example, a return address 208, a sequence number, an endorsement line, a key line, a weight class, etc. Additional information necessary to satisfy U.S., European, and/or another country's postal requirements is also envisioned in accordance with this disclosure. If the envelopes of various sizes were not run upside down, indicia printer 142 may not be located at a fixed height from the bottom of transport path 122. A lead edge, generally designated 206a, of envelope 205 as it is placed on the magazine is identified in FIG. 1, while a trail edge, generally designated 206b, of envelope 205 is the opposite edge of lead edge 206a.

Continuing with FIG. 1, envelope processing starts when feeder 115 inserts an envelope (e.g., a mailpiece) into the nip of the belts of transport path 122 and the envelope is detected by an input detector such as input photo sensor 120. The input detection event starts the mailpiece tracking as it moves along transport path 122. A mailpiece ID is established and a data file is established and associated with the mailpiece ID. The position of every mailpiece in transport path 122 is tracked using numerous photo detectors and knowledge of the transport speed. An exemplary transport speed is approximately 165 ips (inches per second), although other speeds are also possible and envisioned in accordance with this disclosure. When the mailpiece reaches image processor 125, address data 209 is read plus additional parameters in the key line, which is usually located above the address data. The key line can contain the weight data or weight class of the mailpiece. Other printed indicators can be included on the face of the envelope that identify the delivery class of the mailpiece, such as, for example, First Class, Standard Class and postage indicia to be used (e.g., permit indicia or meter indicia). Other indicators can be added as available or as required to provide information about the mailpiece and its contents. A height of envelope 205 is determined by the imaging system or by photo sensors and a length is determined by measuring the time a tracking photo sensor is blocked versus the transport speed.

If weight data was not obtained from the image processor 125, a scale system can be used, such as a scale system comprising scale 1, designated 130, and scale 2, designated 134. Since the transport speed does not allow for sufficient settling time for the scale weighing element, a two scale system, as illustrated in FIG. 1, is utilized. A required settling time can be achieved with two scales where the mailpieces are alternated between the scales 130, 134. Bypass path 136 is provided for mailpieces that do not need to be weighed. When the mailpiece reaches scale weight read photo sensor 138, the weight data is appended to the data file associated with the mailpiece ID. The latency period required from the time the mailpiece enters the scale to when the weight value is read can be, for example, approximately 125 msec, although other scale latency periods are possible and envisioned in accordance with this disclosure. Alternatively, in some embodiments the weight data per mailpiece is obtained from inline scale(s), a data record associated with the mailpiece, or from data read from the mailpiece. A separate thickness detector can be added to the transport before or upstream from scale weight read photo sensor 138. The mailpiece weight and dimensions are used for determining class of service and postage due.

When the mailpiece arrives at image data collection photo sensor 139, the data obtained from the image of the mailpiece is read and stored in a mailpiece ID data file. This data can include a delivery point code, a weight, a postage indicia type, a mail delivery class, and/or an address read. However, other image derived parameters are possible and envisioned in accordance with this disclosure. The image processing latency period from start of image capture to mailpiece arrival at the image data collection sensor is, for example, approximately, 725 msec. Other image processing latency periods are possible and envisioned in accordance with this disclosure. At the time of arrival of the mailpiece at image data collection photo sensor 139, all of the data needed to request indicia to be printed in indicia print area 207 from the next PSD (321-326) that is available, i.e., in a round robin sequence. For example, PSD 321 is first requested, then PSD 322, PSD 323 would be skipped if unavailable, PSD 324 would then be requested, and etc. The PSD postage request is then completed. The latency period for the PSD to generate a digital signature is governed by the time required to obtain postage from the PSD vault. This latency can be, for example, approximately 187 msec, although other vault access latency periods are possible and envisioned in accordance with this disclosure. When the mailpiece arrives at printer data transfer photo sensor 140, the printer command for the mailpiece can be formatted using the postage indicia data matrix digital signature from the PSD, template selection and other data variables (see, e.g., 460-465, FIG. 4). The printer command data is transmitted to indicia printer 142 where the print command is generated and loaded into the print queue.

Figure 3:
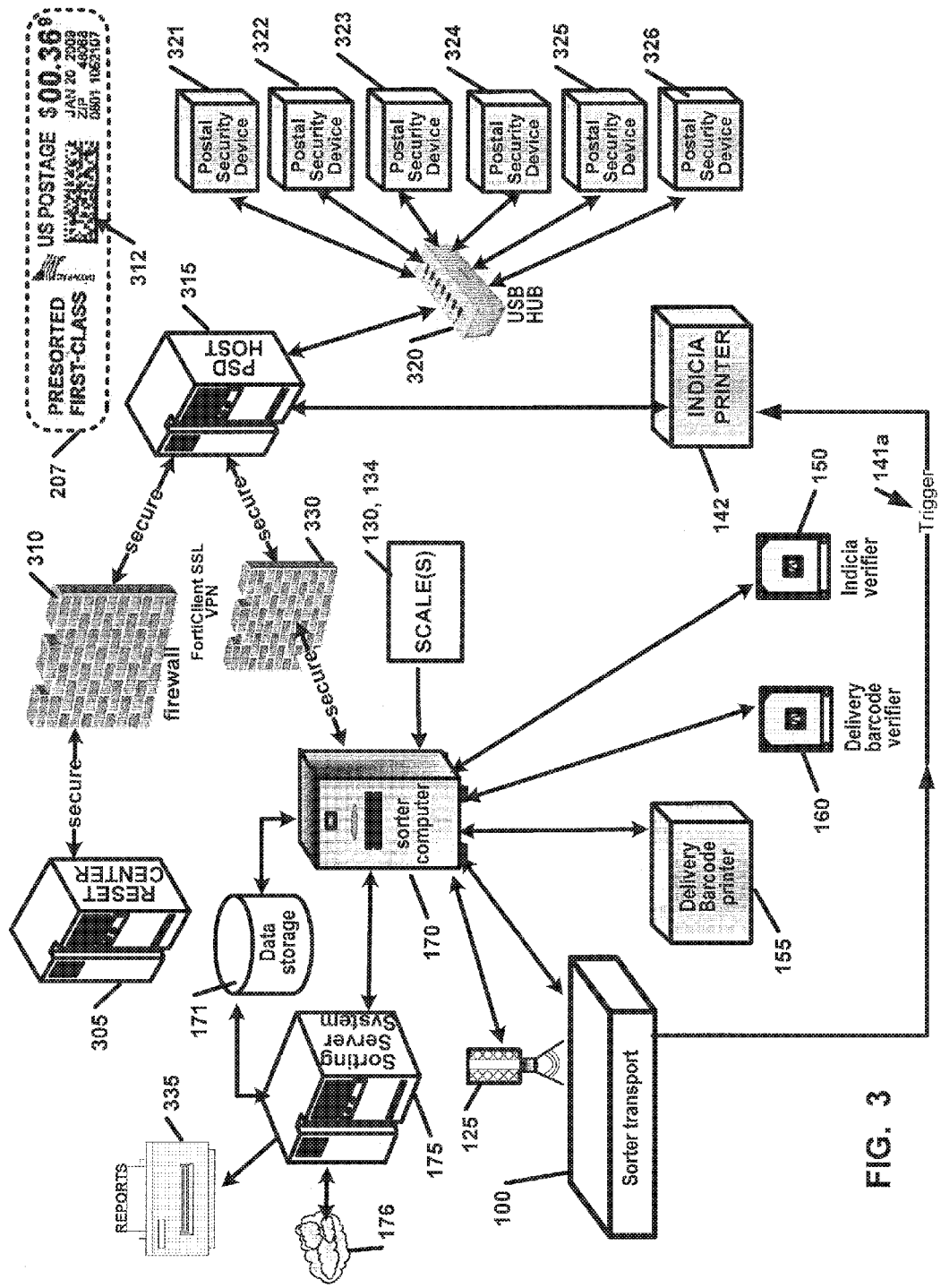
FIG. 3 is an example schematic illustration of the data processing architecture for a sorter system using a hub based PSD assembly for applying franking to mailpieces, in accordance with the disclosure herein.

The postage indicium includes a coded digital signature, representing postage to be applied to a mailpiece, which can be contained in a data matrix (see, 312, FIG. 3). However, other digital signature encoding techniques are possible and envisioned in accordance with this disclosure, even without a data matrix implementation, and can be accommodated to meet objectives of the approving postal authority. The print queue allows for storage of print commands that are received before the mailpiece arrives at indicia printer 142 and thus maintains synchronization with the order of the mailpieces in transport path 122. When the mailpiece is detected by print trigger photo sensor 141, printing is enabled with trigger signal 141*a* (see FIG. 3). The trigger signal 141*a* is sent directly to indicia printer 142 or sent to sorter computer 170 and forwarded to indicia printer 142. Alternately, the print trigger can be sent to both indicia printer 142 and sorter computer 170 simultaneously. Further details associated with the data processing requirements are explained in reference to FIG. 3.

The printed indicium is verified to be correct by comparing the key features of the indicia with the values that were expected to be printed on the mailpiece. Indicia verifier 150 (e.g., an indicia print verifier) uses a barcode reader to read the contents of the indicium data matrix, associated with the indicium. Key values are encoded in the data matrix, such as but not limited to postage paid, security code, unique identifier, delivery point code, weight and/or weight class. Alternately, an image capture device such as, for example, a line scan camera or an area camera is used to capture an image of the region of the mailpiece that is reserved for the indicium and other items, such as an endorsement line, a delivery point code, or a return address. A combination of barcode decoder algorithms and optical character recognition (OCR) algorithms is used to read the parameters needed for indicia print verification. The parameters read by indicia verifier 150 are transmitted to sorter computer 170 for comparison with the values expected for the mailpiece, based on the mailpiece tracking algorithms used to identify which mailpiece is projected to be at a given photo sensor along transport path 122. Sorter computer 170 stores the parameters for the printed material and the PSD coded data matrix content for use in the verification process. The contents of the data matrix are transmitted to sorter computer 170 from PSD host 315 (FIG. 3) when the data matrix is catenated onto the print file and the print file is added to the print queue. The verification process determines if the printed material on the mailpiece is correct and determines if the data encoded in the data matrix matches the expected values. Thus, verification of the synchronization of the printed indicia matches the expected values as determined by the mailpiece tracking. In other words, the correct indicia and other content are printed on the correct mailpiece.

Figure 2:
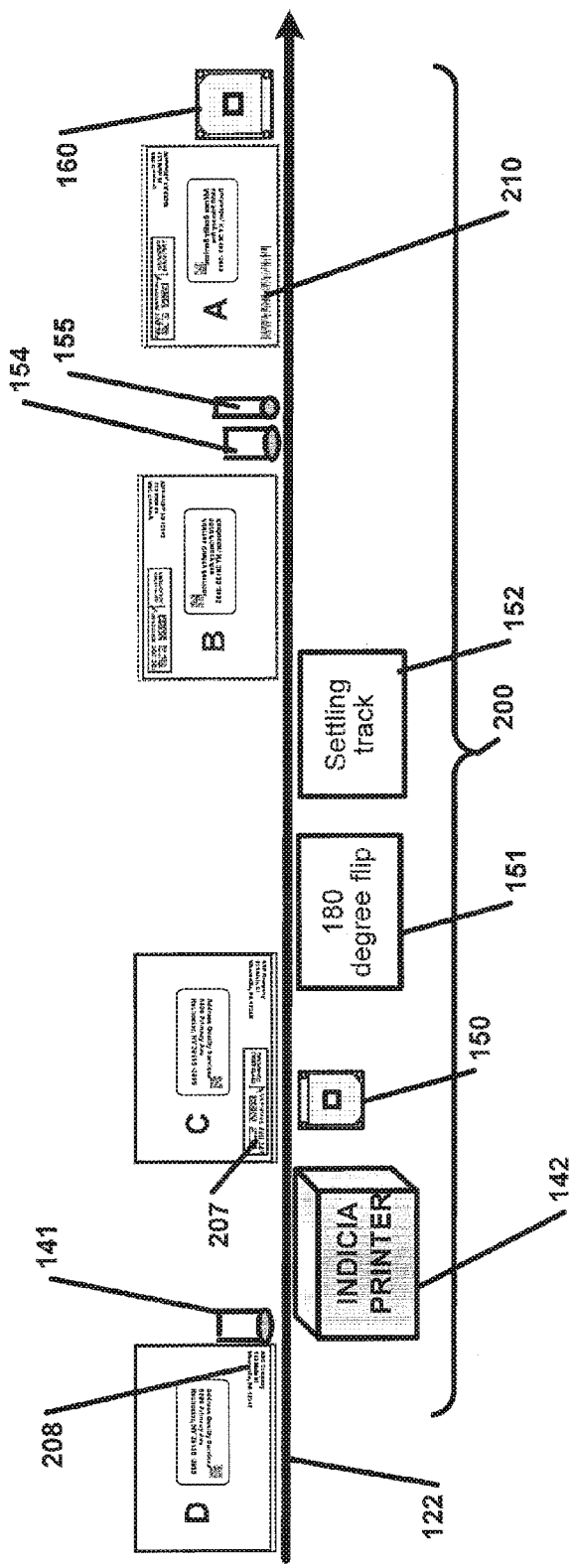
FIG. 2 is an example schematic illustration of the relative positions of four mailpieces as they transition through an assembly for applying postage indicia to one or more sequential mailpieces on a high speed mail sorter, in accordance with the disclosure herein.

Referring to FIG. 2, an enlarged illustration of franking section 200 of the sorter system 100 for indicia printing through delivery barcode printing in the transport path 122 is provided. In FIG. 2, mailpiece D has arrived at the print trigger photo sensor 141 in transport path 122. Return address 208 is pre-printed on mailpiece D. As an alternative, the return address can be printed by the indicia printer 142. The print area height can be approximately two inches high to accommodate all the expected indicia and other material printing requirements. Other print area heights are possible and envisioned in accordance with this disclosure and can be accommodated to meet printing requirements. Printing can occur below the bottom transport belt instead of adding a belt gap to print through a gap, which can be expensive. The printing can be performed across a top of the mailpiece. However, the mailpiece can be inverted in transport path 122 and justified to a known distance above the transport wear plate for the printer to locate the printing correctly on the mailpiece. FIG. 2 also illustrates mailpiece C being verified by indicia verifier 150. Indicium has been printed in indicia print area 207 on mailpiece C. Indicia verifier 150 can be used to verify the content of all of the material printed across the top of the mailpiece, whether the material is pre-printed or printed by indicia printer 142. In some embodiments, a single printer is used to print all indicia. In other embodiments, multiple printers, which may be in series or in parallel with each other, are used to print indicia on the mailpieces. The United States Postal Service (USPS) requires that a delivery point barcode be printed in a specific clear zone on a bottom of the mailpiece, while other countries may have different requirements. As a result, in the U.S., the mailpiece must be flipped 180 degrees and settled to a known distance above the wear plate of the transport. FIG. 2 also illustrates mailpiece B, which has been flipped and settled. A 180 degree flip module 151 and settling track 152 are technologies well known by those skilled in the art. Delivery point barcode 210 is printed by barcode printer 155 when triggered by second barcode print trigger photo sensor 154. Mailpiece A has both the indicium and delivery point barcode 210 printed in their relative positions. Barcode verifier 160 verifies delivery point barcode quality and placement on the correct mailpiece. Based on the delivery point barcode, the mailpiece is sorted into the appropriate sort bin (165, FIG. 1) as directed by the sort scheme. Some postal authorities outside the U.S. do not require a delivery point barcode at bottom of the mailpiece. Instead, they require the barcode to be below the indicia area. Provided indicia printer 142 print area height is sufficient, the delivery point barcode can be printed by indicia printer 142 and verified by indicia verifier 150. This eliminates the need for the 180 degree flip module 151, settling track 152, second barcode print trigger photo sensor 154, barcode printer 155 and barcode verifier 160.

Turning to FIG. 3, an exemplary illustration of the PSD hub assembly and data process architecture for the franking and sorter systems is provided. In some aspects, a PSD hub assembly includes a plurality of PSDs (e.g., 321-326), a PSD host 315, and an indicia printer 142. The architecture supports high levels of data security for the access to the PSD, which contains a secure postage vault where postage funds are saved as encrypted data. Access to the postage funds is obtained through a secure protocol with PSD host 315. The PSD accesses the vault to obtain postage and to generate a digital signature for a data matrix 312 for inclusion in indicia print area 207. The data matrix 312 contains data which can include an encrypted security code, a unique identifier, postage affixed, a delivery point code, date, weight, and mail class. USPS specifies the following parameters be encoded in the Information Based Indicia data matrix, including, for example, Indicia Version Number 255=0xFF; Piece Counter; IBI Vendor/Model 97=0x61; PSD Serial Number; Postage Value; Intelligent Mail Service; and HMAC Message Digest. Other PSD data parameters are possible and envisioned for inclusion in the data matrix in accordance with this disclosure and can be accommodated accordingly to meet PSD design requirements.

PSD vaults (321-326) are filled with funds by a secure connection through the USB HUB 320 to the PSD host 315. Connection to the postage reset center 305 is made through a secure encrypted communication through firewall 310 and is secured from connection (or connecting) to external networks. At the start of a shift or sorting job, the PSD vaults are checked for sufficient funds to meet the expected postage needs. The funds required are based on, for example, actual knowledge of the jobs to be run or past experience. If a PSD approaches exhaustion of the funds, an alert is displayed. If the funds are depleted, the sorting may have to be stopped and the PSD(s) reset with funds. The postage reset process is isolated from non-secure external or outside connections to prevent unauthorized access. Other computers or processing units could also be secured and in communication with the PSD host and within the secure connection and isolated from non-secure or outside connections.

Reset of the PSDs is performed on an as-needed basis, or all PSDs are brought to a fixed amount of postage based on operational considerations. Since the PSDs are utilized on a round-robin (or alternating) method to obtain postage funds during sorting operations, the level of funds in each PSD vaults will decrease roughly equally. PSD reset is accomplished by using PSD host 315 to connect one of the PSDs to the postage reset center 305 via USB HUB 320 with encrypted secure communication through firewall 310. After funds are transferred the connection is terminated.

With continued reference to FIG. 3, parameters associated with operation can be obtained by sorting server 175 for sources on a network 176 (e.g., via a WAN or LAN connection). This data can include known parameters for the sorting jobs to be run, indicia templates, and customer identification (ID). Other operational data parameters are possible and envisioned for inclusion in the setup data in accordance with this disclosure. Sorting server 175 can also be configured to collect sorting results from each sortation job and file these results in data storage 171. The sortation job data is compiled into client reports, mailing statements for the postal authority, and/or other delivery service and other reports a dictated by operations. The reports are printed 335 or distributed on the network 176.

Sorter computer 170 receives the data needed for operation of a sorting job from data storage 171 or direct communication for sorting server 175. An operator interface connected to sorter computer 170 enables the operator to control the sorter setup, job run and data collection processes. Sorter computer 170 is in communication with most devices attached to sorter system 100. This includes discrete signals from photo sensors, barcode printer 155, barcode verifier 160, indicia verifier 150, image processor 125, scales 130, 134, and PSD host 315.

In some aspects, and in order to obtain the highest level of security, sorter computer 170 may not be directly connected to indicia printer 142. Parameters required to be printed across the top of the mailpiece, excluding data matrix 312, are sent to PSD host 315 across firewall 330 protected secure interface. The print parameters are sent to PSD host 315 in sequential order that is synchronized to the order of the mailpieces in the transport path 122. PSD host 315 combines the data matrix from the PSD vault that contains a digital signature, associated with the postage amount applied to the mailpiece, with the data and print template sent from sorter computer 170. PSD host 315 transmits the data required for indicia printer 142 to generate a printer command and load the command into the print queue in indicia printer 142. PSD host 315 sends the data values encoded in data matrix 312 to sorter computer 170 for use in the indicia verify process.

In other aspects, sorter computer 170 can be directly connected to indicia printer 142 for queueing the print data. For example, sorter computer 170, rather than PSD host 315, can generate a printer command and load the command into the print queue in indicia printer 142. Notably, some postal authorities may require, for security purposes, that the sorter computer and the indicia printer not be directly connected (see FIG. 3), while others may not have as stringent requirements.

In order to reduce the processing time to create indicia printer 142 commands, a large number of pre-defined indicia templates can be loaded into the indicia printer in advance of sorting operations. A library of pre-defined templates can be stored in indicia printer 142 that will be available for multiple sorting jobs. The library is updated for any new templates that are required before the sorting is started. The templates can include postage indicium for multiple presort discount postage classifications offered by the postal authority or delivery service. For example, templates for different presort classifications such as, PRESORTED FIRST-CLASS, PRESORTED STANDARD CLASS, etc., can be used. Templates for different depth of sort postage values, based on presort qualification numbers, are another template variable. Templates may include different permit marks, company logos and special markings required for indicium. Templates for other features such as a return address, delivery point code and endorsement line are included in the template set. Other template designs are possible and envisioned for inclusion in the template library in accordance with this disclosure and may be accommodated to meet design requirements associated with printing material on the top area of a mailpiece. If a feature is likely to be printed multiple times, it is a candidate for inclusion in the template library. This architecture limits the amount of data that has to be transferred to indicia printer 142 for each mailpiece. Variable data and template selections from the library are required parameters. The controller for indicia printer 142 formats the printer commands by inserting variable parameters into the template and storing the resultant print commands in the print queue. Pre-defined templates, such as pre-defined print templates for example, can be interleaved and do not have to be in a certain order. For example, this can allow for using pre-defined print templates for printing a meter mark, then printing a permit mark, and then reverting back to printing a meter if desired.

As an alternative, depending on data security requirements, communication with indicia printer 142 can be from sorter computer 170. The data matrix digital image from PSD 321 would be transferred to sorter computer 170 from PSD host 315. Sorter computer 170 would transfer the variable data, data matrix and template selection for each mailpiece to indicia printer 142.

When the mailpiece arrives at print trigger photo sensor 141, a trigger signal 141*a* (e.g., a print trigger signal) is sent to indicia printer 142. Trigger signal 141*a* starts the print cycle for the mailpiece using the next print command in the print queue. In addition, trigger signal 141*a* can be sent to sorter computer 170 to aid in mailpiece and process tracking. When a mailpiece detect signal from the photo sensor associated with indicia verifier 150 is triggered, indicia verifier 150 reads data matrix 312 and sends the values to sorter computer 170 for comparison with the data matrix values, sent from PSD host 315, for the mailpiece just printed. If the values match, verification that the correct indicium was printed on the correct mailpiece is completed. If parameters other than those that can be read by a barcode reader must be verified, indicia verifier 150 captures an image of the mailpiece. The verification parameters are read with OCR technology and verified against expected values.

If a barcode printer 155 (e.g., a delivery point barcode printer) is required, the mailpiece will trigger the printer photo sensor (see, e.g., 154, FIG. 1) and barcode printer 155 will print the delivery point barcode. A barcode verifier 160 is used to verify the delivery point barcode. Barcode printing and verification are well known by those skilled in the art.

The indicia content or meter indicia format can be changed on demand as required for the mailpiece and sent to indicia printer 142. The type of image or indicia used can be based on customer or location that the mailpiece is being delivered to or by. The mailpiece could get a permit or a meter mark depending on to whom and how it is to be delivered and/or based on a customer profile of a customer that is providing the mail. In the past, meter PSD devices were not constructed or programmed to change the indicia continuously in process by mailpiece. In the past, all processing with single indicium type was done in batch mode.

The indicia printing system can operate in dynamic mode, where the postage amount and class of service change for each mailpiece and where both meter indicia and permit indicia can be printed. Data records are maintained for each mailpiece sorted. These data records can include, for example, presort results, a delivery point barcode, postage applied or postage due for a permit, etc. The mailpiece data can be sorted as required in order to provide postal authority documentation about mailpiece characteristics and postage applied according to the mailings to be claimed and the associated mailer identification information. Mailpieces that cannot be co-mingled (i.e., grouped by postal requirements for a mailing to be submitted for delivery) are sorted to different bins and submitted separately to the postal authority. Additional mailpiece data is collected as required for client and postal authority reports.

Figure 4:
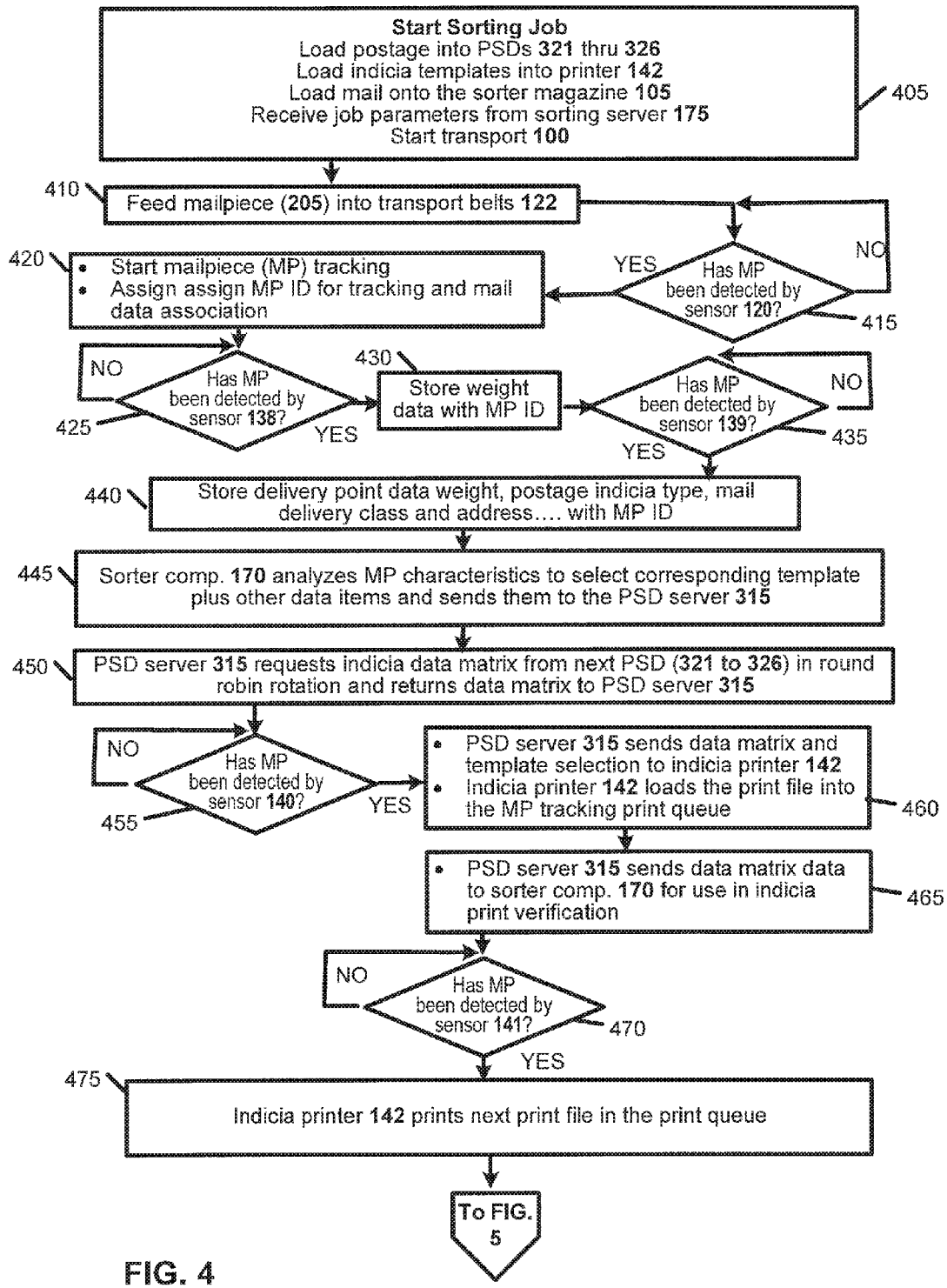
FIG. 4 is an example flow diagram for a method of applying postage indicia to one or more sequential mailpieces on a high speed mail sorter, in accordance with the disclosure herein.

Referring now to FIG. 4, an exemplary mail processing diagram illustrating steps for a mailpiece being franked and sorted by a mail sorter is provided. The franking system provides secure postage evidencing as required by the postal authority. Each mailpiece that requires the application of postage indicia follow these steps. Alternatives to some of the steps, based on the security protocol, are included in the proceeding sections. Sorter mailpiece tracking technology is employed to track the position of each sequential mailpiece fed from magazine 105 as illustrated in FIGS. 1-3. Predictive position algorithms are used to estimate the time of arrival of a mailpiece at a given photo sensor along the transport path 122. Photo sensors and encoders, which output a signal that is proportional to the speed of a transport section, provide needed inputs. The use of encoders enables tracking to continue during transport startup and stop. A triggered photo sensor can initiate some action from peripheral devices attached to transport path 122 such as printers and verifiers. If the time of arrival is missed within a tolerance, the sorter control system records a jam condition, slippage, and/or a fly-out event. The mailpieces that fail the time-of-arrival criteria are sorted to an appropriate sort bin 165 (e.g., a reject bin). Other mailpieces can be removed from transport path 122 as part of a jam clearance. Data records may be maintained for each of these mailpieces and postage recovery processes are implemented as required.

Step 405 identifies startup actions related to the franking functions defined herein. Postage is loaded into PSDs 312-326 via postage reset center 305. Printer templates required for indicia and other top of the mailpiece printing are loaded into the template library. Mailpieces are loaded onto magazine 105 and sorter system 100 is started.

In step 410 a mailpiece is fed into the belts of transport path 122 governed by the pitch or gap mailpiece spacing requirements.

In step 415, a determination as to whether the mailpiece has been detected by input photo sensor 120 is made. If not, a wait loop is executed until the feeder provides a mailpiece or the sorter is stopped.

When the mailpiece is detected, mailpiece tracking is initiated and mailpiece identification is established and a data record is opened to store data associated with the mailpiece and status of each sorter process performed on that mailpiece, step 420.

In step 425, a determination as to whether the mailpiece has been detected by scale weight read photo sensor 138 is made. If not, a wait loop is executed until mailpiece tracking tolerance is exceeded.

If the tracking indicates an error, corrective action is initiated. When the mailpiece reaches scale weight read photo sensor 138, the weight data is appended to the data file associated with the mailpiece ID, step 430.

In step 435, a determination as to whether the mailpiece has been detected by image data collection photo sensor 139 is made. If not, a wait loop is executed until mailpiece tracking tolerance is exceeded. If the tracking indicates an error, corrective action is initiated.

When the mailpiece arrives at image data collection photo sensor 139, the data obtained from the image of the mailpiece is read and stored in the mailpiece ID data file, step 440. This data may include, for example, delivery point code, weight, postage indicia type, mail delivery class and address read. At image data collection photo sensor 139 mailpiece detect point, all of the data needed to request an indicia 311, FIG. 3 from the next PSD (321-326) is available based on the round robin sequence.

In step 445 the sorter computer 170 analyzes the mailpiece characteristics to select the library template based on parameters based on design requirements associated with printing material, such as, for example, mail class, presort qualification, weight and indicia format. Other parameters associated with template selection are possible and envisioned for inclusion in accordance with this disclosure and may be accommodated in the design to meet design requirements associated with printing material on the top area of a mailpiece.

In step 450, the PSD host 315 requests an indicium data matrix from the next PSD (321-326) in the round robin sequence. When the PSD has completed the withdrawal of funds from the vault and generated the data matrix, the data matrix is returned to the PSD host 315.

In step 455, a determination as to whether the mailpiece has been detected by the printer data transfer photo sensor 140 is made. If not, a wait loop is executed until mailpiece tracking tolerance is exceeded. If the tracking indicates an error, corrective action is initiated.

When the mailpiece arrives at the printer data transfer photo sensor 140, the printer command for the mailpiece is formatted using, for example, the postage indicia data matrix digital signature from the PSD, template selection, and other data variables, step 460. The printer command data is transmitted to the indicia printer 142 where the print command is generated and loaded into the print queue.

In step 465, the PSD host 315 sends the data matrix values to the sorter computer 170 to be used in the indicium verification process. In step 470, a determination as to whether the mailpiece has been detected by the print trigger photo sensor 141 is made. If not, a wait loop is executed until mailpiece tracking tolerance is exceeded. If the tracking indicates an error, corrective action is initiated.

When the mailpiece is detected by print trigger photo sensor 141, printing is enabled with trigger signal 141*a*. The trigger signal 141*a* is sent directly to the indicia printer 142, step 475.

Figure 5:
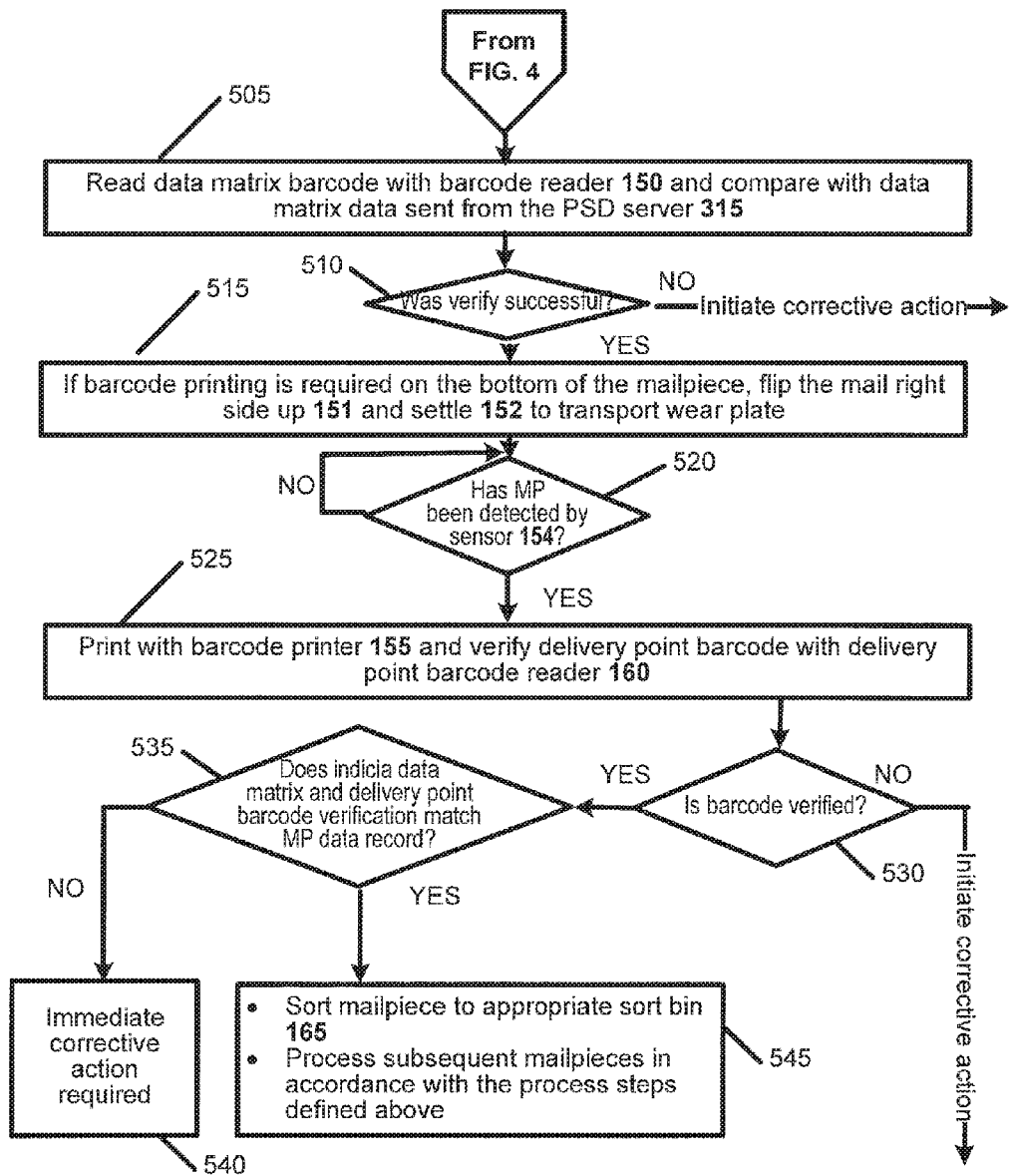
FIG. 5 is a continuation of the example flow diagram of FIG. 4 of the mailpiece deceleration process to reduce the mailpiece speed from sorter transport speed to indicia print speed, in accordance with the disclosure herein.

Referring now to FIG. 5, a continuation of the mailpiece processing step description is provided. In step 505, the indicia verifier 150 uses a barcode reader to decode the data matrix and send data values to the sorter computer 170 for comparison with the data values sent by the PSD host 315 for the mailpiece. If other printed parameter are required to be verified, image capture and OCR technology is used to read those parameters and compare them to the parameters in the print command.

If the verify failed, step 510, corrective action may be required for that mailpiece. If the verify of step 510 is successful, and printing is required on the bottom of the mailpiece, the mailpiece is flipped 180 degrees with a 180 degree flip module 151 (e.g., a twisted belt system) and entered into a settling track 152.

The settling track allows for a correction of mailpiece skew and justification to the wear plate in the transport path 122, step 515.

In step 520, a determination as to whether the mailpiece has been detected by second barcode print trigger photo sensor 154 is made. If not, a wait loop is executed until mailpiece tracking tolerance is exceeded. If the tracking indicates an error, corrective action is initiated.

When the mailpiece is detected, the delivery point barcode is printed by barcode printer 155 and then verified with the barcode verifier 160, step 525.

A determination as to whether the barcode is verified is made in step 530. If the delivery point barcode is not verified, corrective action is required.

If the delivery point barcode verify is successful, the data in the mailpiece data file for the data matrix and for the delivery point barcode are compared with the data from the indicia verify and the data from the barcode verify to determine if they match, step 535.

If they do not match, immediate correction action may be required, step 540. For example, a serious print synchronization has occurred and sorting must be stopped.

If the verification was successful, the mailpieces are sorted to the appropriate sort bin 165 and subsequent mailpieces will be processed in accordance with the process steps defined above in FIGS. 4 and 5, step 545, of when franking is required.

As shown by the above description, functions relating to the operation of the high speed franking system on a sorter system 100 are implemented in the hardware and controlled by one or more computers. The sorting server 175 and PSD host 315 can be implemented with a server architecture, and the sorter computer 170 and peripheral computers such as required for printers 142 and 155, verifiers 150 and 160 plus the image processor 125 can be implemented with a personal computer architecture. All of the computers are connected to the high speed franking system on a sorter system 100 and are connected to each other via network as shown in FIG. 3. Discrete interfaces are also used, such as USB or TTL for communication to the high speed franking system on a sorter system 100. Although special purpose devices can be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data. The software code is executable by the general-purpose computer that functions as the sorter computer 170 and/or the associated terminal device. In operation, the code is stored within the general-purpose computer platform. At other times, however, the software can be stored at other locations and/or transported for loading into the appropriate general-purpose computer system. Execution of such code by a processor of the computer platform enables the platform to implement the methodology for tracking of mail items through a postal authority network with reference to a specific mail target, in essentially the manner performed in the implementations discussed and illustrated herein.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 can also act as a server if appropriately programmed. It is believed that those skilled in the art are familiar with the structure, programming and general operation of such computer equipment and, as a result, the drawings should be self-explanatory.

For example, sorter computer 170 can be a PC based implementation of a central control processing system like that of FIG. 7, or can be implemented on a platform configured as a central or host computer or server like that of FIG. 6. Other data processing and network architectures for the servers, computers and peripherals are possible and envisioned for inclusion in accordance with this disclosure and may be accommodated in the design to meet design requirements associated with control and data processing. Such a system typically contains a central processing unit (CPU), memories and an interconnect bus. The CPU can contain a single microprocessor (e.g. a Pentium microprocessor), or it can contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for tracking of mail items through a postal authority network with reference to a specific mail target, as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as a "program article of manufacture" may take the form of code or executable instructions for causing a computer or other programmable equipment to perform the relevant data processing steps, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A postal security device (PSD) hub assembly for franking one or more sequential mailpiece on a high speed mail sorter, the assembly comprising:

a plurality of PSDs configured to generate a coded digital signature for the one or more sequential mailpiece during a latency period;

a PSD host configured to receive the generated coded digital signature, wherein the generated coded digital signature is encoded in a data matrix; and an indicia printer configured to receive printer control data and to print the printer control data on the one or more sequential mailpiece in an order in which the plurality of PSDs are tasked during the latency period.

2. The assembly of claim 1, wherein the plurality of PSDs are configured to be tasked in a round robin sequence.

3. The assembly of claim 1, wherein a single printer is used to print all indicia.

4. The assembly of claim 1, wherein the high speed mail sorter is capable of running greater than 30,000 mailpieces per hour.

5. The assembly of claim 1, wherein weight data per mailpiece is obtained from inline scale(s), a data record associated with the mailpiece, or from data read from the mailpiece.

6. The assembly of claim 1, wherein the printer control data is configured to be formatted using the generated coded digital signature encoded in the data matrix.

7. The assembly of claim 1, wherein the indicia printer is configured to print additional items selected from the group consisting of a return address, a sequence number, an endorsement line, a key line, and a weight class.

8. The assembly of claim 1, wherein the indicia printer comprises an interface that is restricted to the PSD host, and wherein the PSD host is secured from connection to external networks.

9. The assembly of claim 1, wherein the data matrix comprises at least two or more values selected from the group consisting of an indicia version number, a piece counter, an IBI vendor and/or model, a PSD serial number, a postage value, Intelligent Mail Service, and an HMAC message digest.

10. The assembly of claim 1, wherein the indicia printer is configured to utilize one or more pre-defined print template.

11. The assembly of claim 10, wherein the one or more pre-defined print template is interleaved.

12. The assembly of claim 10, wherein the one or more pre-defined template comprises one or more feature selected from the group consisting of different permit marks, company logos and special markings required for indicium, mail class, presort qualification, and weight.

13. The assembly of claim 1, further comprising a USB HUB configured to provide a secure connection between the plurality of PSDs and the PSD host.

14. The assembly of claim 1, wherein the indicia printer is configured to receive the printer control data from the PSD host.

15. The assembly of claim 1, further comprising a sorter computer configured to receive the printer control data from the PSD host and transmit the printer control data to the indicia printer.

16. A system for franking one or more sequential mailpiece using a postal security device (PSD) hub assembly on a high speed mail sorter, the system comprising:

a plurality of PSDs configured to generate a coded digital signature for the one or more sequential mailpiece during a latency period;

a plurality of photo sensors configured to define the latency period, wherein the latency period is a period of time sufficient for transfer of the generated coded digital signature from one of the plurality of PSDs;

a PSD host configured to receive the generated coded digital signature, wherein the generated coded digital signature is encoded in a data matrix; and an indicia printer configured to receive printer control data and to print the printer control data on the one or more sequential mailpiece in an order in which the plurality of PSDs are tasked during the latency period.

17. The system of claim 16, wherein the plurality of PSDs are configured to be tasked in a round robin sequence.

18. The system of claim 16, wherein the printer control data is configured to be formatted using the generated coded digital signature encoded in the data matrix.

19. The system of claim 16, wherein the indicia printer is configured to print additional items selected from the group consisting of a return address, a sequence number, an endorsement line, a key line, and a weight class.

20. The system of claim 16, wherein the indicia printer comprises an interface that is restricted to the PSD host, and wherein the PSD host is secured from connection to external networks.

21. The system of claim 16, further comprising an indicia print verifier.

22. The system of claim 16, wherein the data matrix comprises at least two or more values selected from the group consisting of an indicia version number, a piece counter, an IBI vendor and/or model, a PSD serial number, a postage value, Intelligent Mail Service, and an HMAC message digest.

23. The system of claim 16, wherein the indicia printer is configured to utilize one or more pre-defined print template.

24. The system of claim 23, wherein the one or more pre-defined print template is interleaved.

25. The system of claim 23, wherein the one or more pre-defined template comprises one or more feature selected from a group consisting of different permit marks, company logos and special markings required for indicium, mail class, presort qualification, and weight.

26. The system of claim 16, wherein the indicia printer is configured to receive the printer control data from the PSD host.

27. The system of claim 16, further comprising a sorter computer configured to receive the printer control data from the PSD host and transmit the printer control data to the indicia printer.

28. The system of claim 16, further comprising a USB HUB configured to provide a secure connection between the plurality of PSDs and the PSD host.

29. A method for franking one or more sequential mailpiece using a postal security device (PSD) hub assembly on a high speed mail sorter, the method comprising:

generating, by a plurality of PSDs, a coded digital signature for the one or more sequential mailpiece during a latency period;

defining, by a plurality of photo sensors, the latency period, wherein the latency period is a period of time sufficient for transfer of the generated coded digital signature from one of the plurality of PSDs;

receiving, by a PSD host, the generated coded digital signature, wherein the generated coded digital signature is encoded in a data matrix; and printing, by an indicia printer, received printer control data on the one or more sequential mailpiece in an order in which the plurality of PSDs are tasked during the latency period.

30. The method of claim 29, further comprising formatting, using the generated coded digital signature encoded in the data matrix, the printer control data.

31. The method of claim 29, further comprising tasking the plurality of PSDs in a round robin sequence.

32. The method of claim 29, further comprising printing, by the indicia printer, additional items selected from the group consisting of a return address, a sequence number, an endorsement line, a key line, and a weight class.

33. The method of claim 29, wherein the indicia printer comprises an interface that is restricted to the PSD host, and wherein the PSD host is secured from connection to external networks.

34. The method of claim 29, wherein the data matrix comprises at least two or more values selected from a group consisting of an indicia version number, a piece counter, an IBI vendor and/or model, a PSD serial number, a postage value, Intelligent Mail Service, and an HMAC message digest.

35. The method of claim 29, further comprising utilizing, by the indicia printer, one or more pre-defined print template.

36. The method of claim 35, wherein the one or more pre-defined print template is interleaved.

37. The method of claim 35, wherein the one or more pre-defined template comprises one or more feature selected from the group consisting of different permit marks, company logos and special markings required for indicium, mail class, presort qualification, and weight.

38. The method of claim 29, further comprising receiving, by the indicia printer, the printer control data from the PSD host.

39. The method of claim 29, further comprising receiving, by a sorter computer, the printer control data from the PSD host and transmitting, by the sorter computer, the printer control data to the indicia printer.

* * * * *